(12) United States Patent
Hamdi

(10) Patent No.: US 12,063,227 B2
(45) Date of Patent: Aug. 13, 2024

(54) SYSTEMS AND METHODS FOR THREAT RESPONSE

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 243 days.

(21) Appl. No.: 17/491,641

(22) Filed: Oct. 1, 2021

(65) Prior Publication Data

US 2022/0109681 A1 Apr. 7, 2022

Related U.S. Application Data

(60) Provisional application No. 63/086,870, filed on Oct. 2, 2020.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 9/40* | (2022.01) |

(52) U.S. Cl.
CPC ...... *H04L 63/1416* (2013.01); *H04L 63/0236* (2013.01); *H04L 63/1425* (2013.01); *H04L 63/145* (2013.01); *H04L 63/20* (2013.01)

(58) Field of Classification Search
CPC ... H04L 63/1416; H04L 63/145; H04L 63/20; H04L 63/0236
USPC .......................................................... 726/22
See application file for complete search history.

(56) References Cited

U.S. PATENT DOCUMENTS

| | | |
|---|---|---|
| 2018/0183821 A1 | 6/2018 | Schneider et al. |
| 2018/0270676 A1* | 9/2018 | Guven ............... H04W 24/06 |
| 2020/0287930 A1* | 9/2020 | Satish ............... H04L 63/1441 |

FOREIGN PATENT DOCUMENTS

EP 3 065 076 A1 9/2016

OTHER PUBLICATIONS

International Search Report and the Written Opinion on PCT Appl. Ser. No. PCT/US2021/053110 dated Jan. 27, 2022 (14 pages).
International Preliminary Report on Patentability on PCT Appl. Ser. No. PCT/US2021/053110 dated Apr. 13, 2023 (8 pages).

* cited by examiner

*Primary Examiner* — Jeffrey C Pwu
*Assistant Examiner* — Samuel Ambaye
(74) *Attorney, Agent, or Firm* — Foley & Lardner LLP

(57) ABSTRACT

Systems and methods for threat response in computer environments can include detecting, by one or more processors, a threat to the computer environment, and identifying a subset of assets of the plurality of assets associated with the threat. The one or more processors can determine from a predefined set of resolutions a plurality of resolutions executable to resolve the threat for the subset of assets. The one or more processors can execute, for each resolution of the plurality of resolutions, a trained model to simulate the resolution for the subset of assets. The one or more processors can select, based at least on results of execution of each resolution, a resolution among the plurality of resolutions to be implemented.

18 Claims, 8 Drawing Sheets

SYSTEMS AND METHODS FOR THREAT RESPONSE

CROSS REFERENCE TO RELATED APPLICATIONS

This application claims priority to, and the benefit of, U.S. Provisional Application No. 63/086,870 filed on Oct. 2, 2020, and entitled "SYSTEMS AND METHODS FOR THREAT RESPONSE," which is incorporated herein by reference in its entirety.

FIELD OF THE DISCLOSURE

The present application relates generally to systems and methods for threat response in a computer environment. Specifically, the present application relates to systems and methods for detecting a threat in a computer environment, simulating a plurality of responses or resolutions, and selecting an adequate response or resolution to the detected threat based on the simulated responses or resolutions.

SUMMARY OF THE DISCLOSURE

According to at least one aspect, a system can include one or more processors communicatively coupled to a computer environment and a memory storing computer code instructions. The computer code instructions, when executed by the one or more processors, can cause the one or more processors to detect a threat to the computer environment, and identify a subset of assets of the plurality of assets associated with the threat. The one or more processors can determine from a predefined set of resolutions a plurality of resolutions executable to resolve the threat for the subset of assets. The one or more processors can execute, for each resolution of the plurality of resolutions, a trained model to simulate the resolution for the subset of assets. The one or more processors can select, based at least on results of execution of each resolution, a resolution among the plurality of resolutions to be implemented.

In some implementations, the one or more processors can implement the selected resolution within the computer environment. The one or more processors can provide information related to implementation of the selected resolution within the computer environment for display on a display device. In detecting a threat, the one or more processors can monitor logs of a firewall of the computer environment for at least one of information related to denied connections, information related to malicious activities, information related to dropped network traffic. In detecting a threat, the one or more processors can perform at least one of monitoring one or more network assets of the computer environment for network performance data, or monitor computing assets of the computer environment for asset performance data.

In some implementations, in identifying the subset of assets, the one or more processors can identify one or more first assets affected by the threat, and identify one or more second assets having an interdependency relationship with the one or more first assets. The subset of assets can include the one or more first assets and the one or more second assets. In some implementations, the plurality of resolutions can include at least one of quarantining one or more assets of the subset of assets, re-routing data traffic, adding storage resources to the computer environment, adding computing resources to the computer environment, adding one or more security rules to a firewall of the computer environment or modifying a configuration of one or more assets of the computer environment.

In some implementations, the predefined set of resolutions can include a plurality of predefined subsets of resolutions. Each predefined subset of resolutions can be associated with a corresponding threat type among a plurality of threat types. In executing trained models to simulate the plurality of resolutions for the subset of assets, the one or more processors can execute each trained model with similar traffic or processing load as a real-time traffic or processing load of the subset of assets. The one or more processors can display a simulation window for each executing trained model. The simulation window can depict simulation progress of the resolution corresponding to the executing trained model.

According to at least another aspect, a method can include detecting, by one or more processors, a threat to the computer environment, and identifying a subset of assets of the plurality of assets associated with the threat. The method can include determining, by the one or more processors, from a predefined set of resolutions a plurality of resolutions executable to resolve the threat for the subset of assets. The method can include executing, by the one or more processors, for each resolution of the plurality of resolutions, a trained model to simulate the resolution for the subset of assets. The method can include selecting, by the one or more processors, based at least on results of execution of each resolution, a resolution among the plurality of resolutions to be implemented.

In some implementations, the method can further include at least one of implementing the selected resolution within the computer environment or providing information related to implementation of the selected resolution within the computer environment for display on a display device. In some implementations, detecting a threat can include monitoring logs of a firewall of the computer environment for at least one of information related to denied connections, information related to malicious activities or information related to dropped network traffic. In some implementations, detecting a threat includes at least one of monitoring one or more network assets of the computer environment for network performance data, or monitoring computing assets of the computer environment for asset performance data.

In some implementations, identifying the subset of assets can include identifying one or more first assets affected by the threat, and identifying one or more second assets having an interdependency relationship with the one or more first assets. The subset of assets can include the one or more first assets and the one or more second assets. In some implementations, the plurality of resolutions can include at least one of quarantining one or more assets of the subset of assets, re-routing data traffic, adding storage resources to the computer environment, adding computing resources to the computer environment, adding one or more security rules to a firewall of the computer environment or modifying a configuration of one or more assets of the computer environment. In some implementations, the predefined set of resolutions can include a plurality of predefined subsets of resolutions. Each predefined subset of resolutions can be associated with a corresponding threat type among a plurality of threat types.

In some implementations, executing trained models to simulate the plurality of resolutions for the subset of assets can include executing each trained model with similar traffic or processing load as a real-time traffic or processing load of the subset of assets. The one or more processors can display a simulation window for each executing trained model. The simulation window can depict simulation progress of the resolution corresponding to the executing trained model.

According to yet another aspect, a computer-readable medium can include computer code instructions stored thereon. The computer code instructions when executed by one or more processors can cause the one or more processors to detect a threat to the computer environment, and identify a subset of assets of the plurality of assets associated with the threat. The one or more processors can determine from a predefined set of resolutions a plurality of resolutions executable to resolve the threat for the subset of assets. The one or more processors can execute, for each resolution of the plurality of resolutions, a trained model to simulate the resolution for the subset of assets. The one or more processors can select, based at least on results of execution of each resolution, a resolution among the plurality of resolutions to be implemented.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes systems and methods for threat response in a computer environment.

A. Computing and Network Environment

Figure 1A:
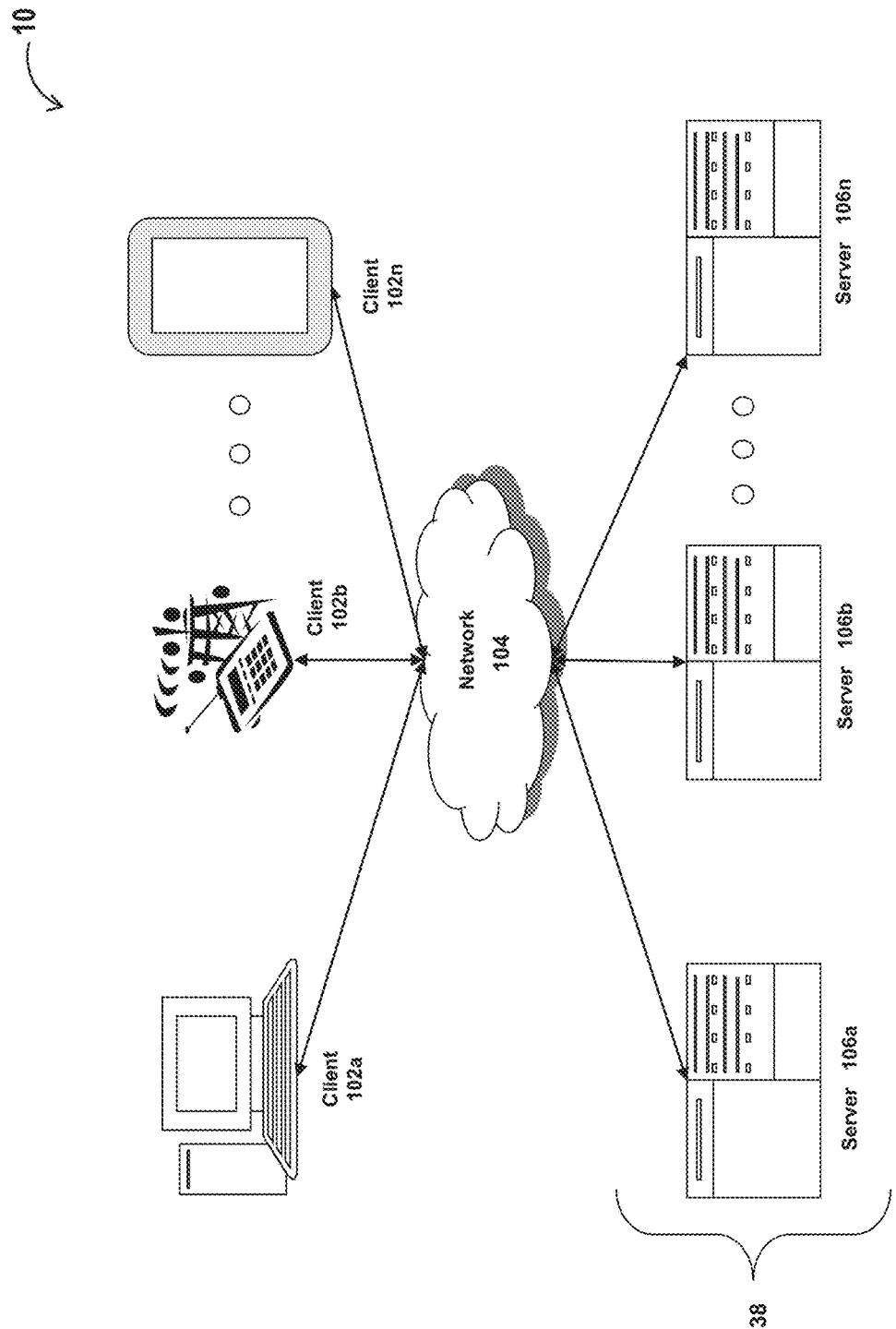
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
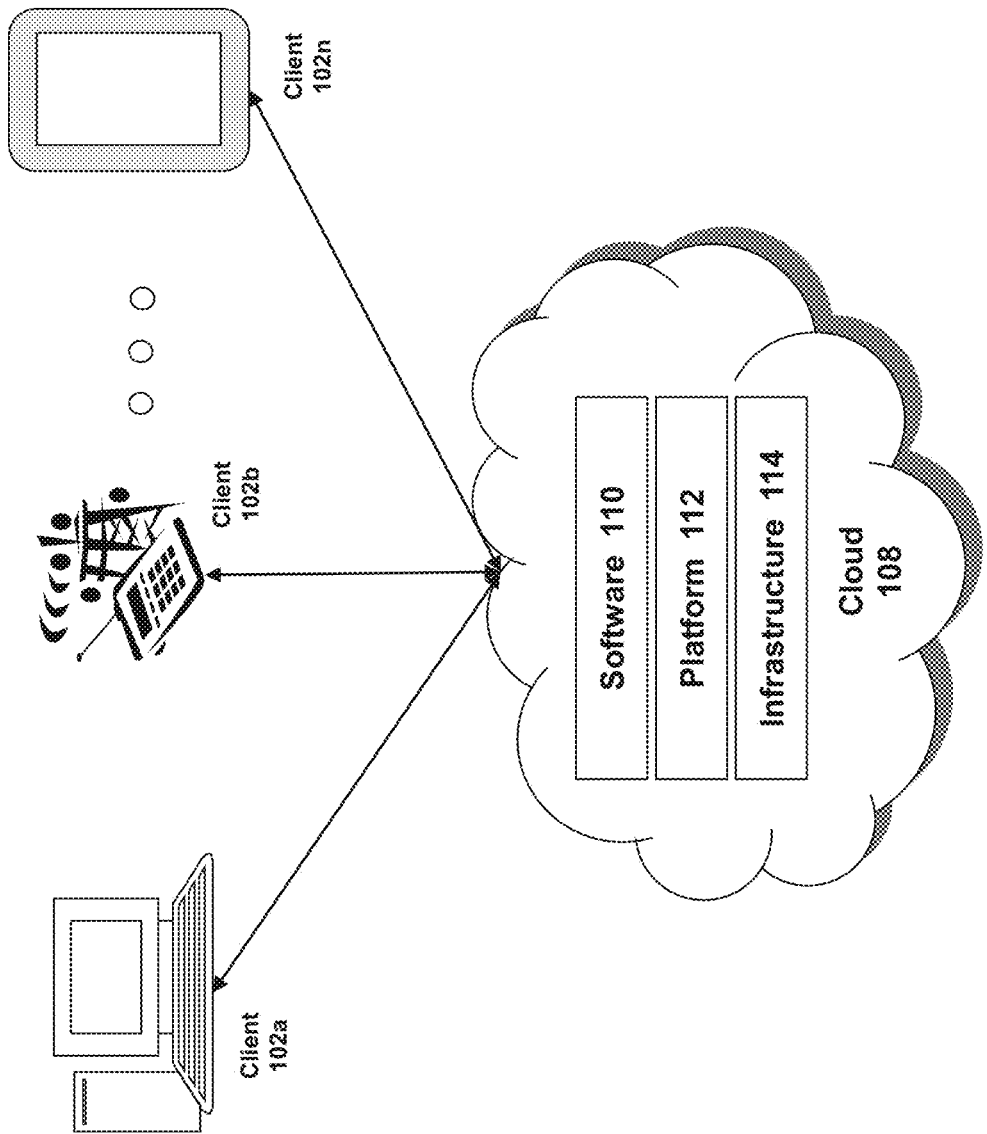
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
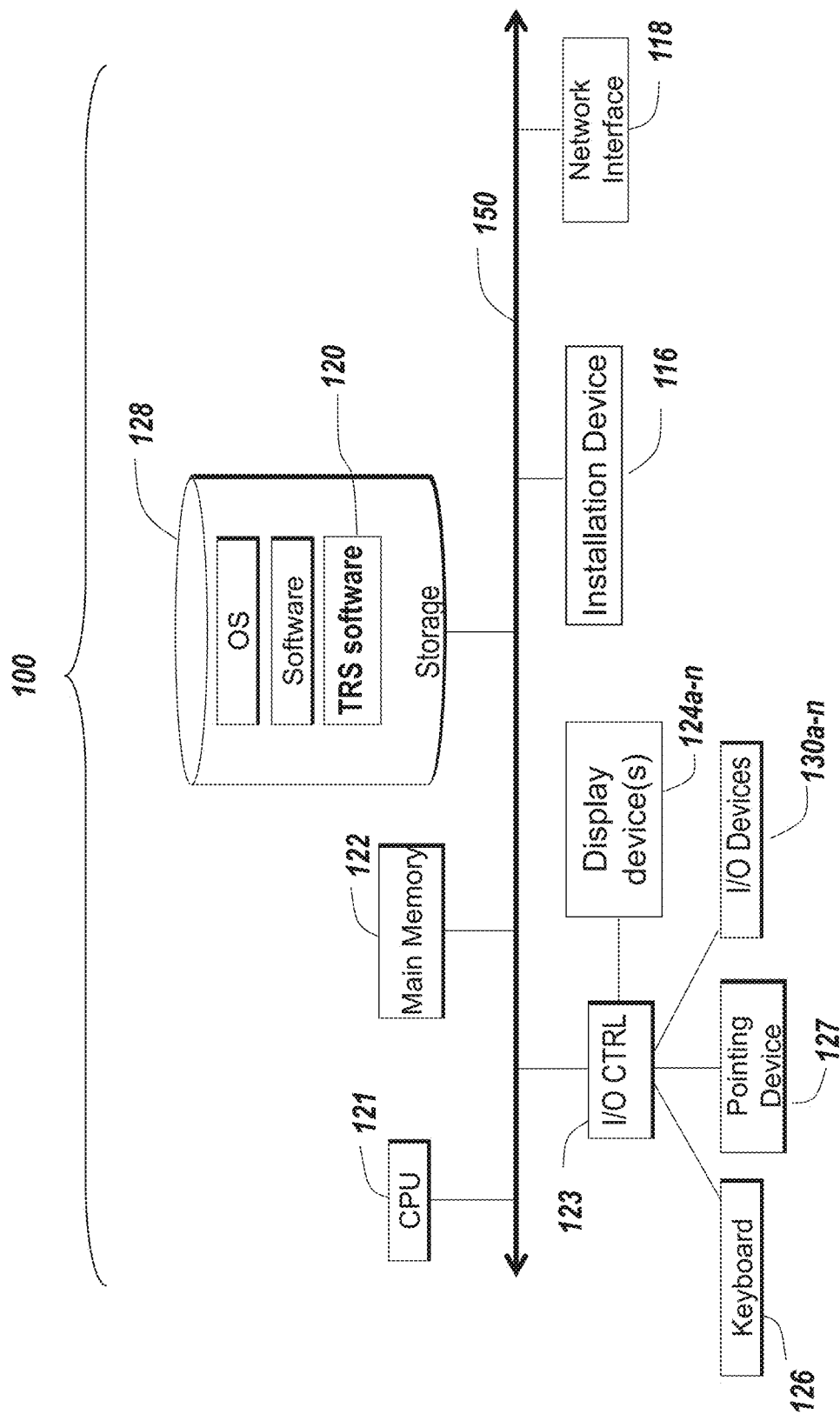
Figure 1D:
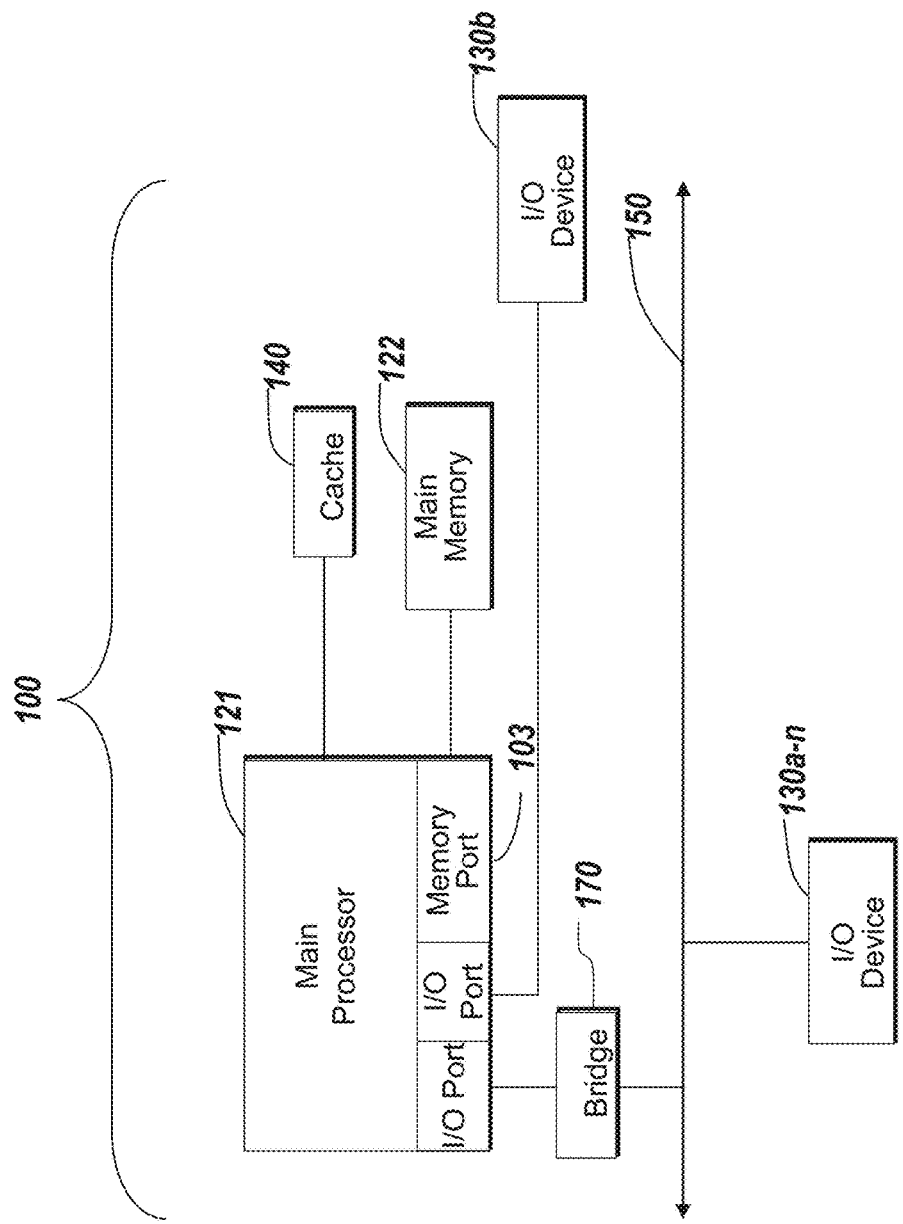

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, a threat response system (TRS) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, B SRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the TRS software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods For Threat Response

The present disclosure relates to systems and methods for threat response in computer environments, such as enterprise networks, cloud systems, banking systems, electric utility systems or medical device networks, among others. Cybercrime is predicted to cost trillions of dollars annually. Threats to computer environments can include a malware attack, phishing attack, man-in-the-middle (MITM) attack, SQL injection attack, zero-day exploit attack, or domain name system (DNS) tunneling attack, among others. Different types of malware include viruses, worms, Trojan horses, spyware, adware, and ransomware, among others.

Viruses are designed to damage the infected computer system or device by corrupting data, reformatting the corresponding hard disk, or completely shutting down the computer system or device. A ransomware usually restricts access to the infected computer system by either encrypting data files or locking down the computer system, and demands payment to restore access to the computer system. A worm is a standalone program that automatically replicates itself within an infected computer environment, and usually includes a piece of code designed to damage the computer system, e.g., by deleting files, encrypting data, stealing information and/or creating botnets. A Trojan horse is usually disguised as a normal file or program, which when installed by a user of a computer environment, gives a cyber criminal access to the computer environment, for example, to steal, modify or destroy data or valuable information, install more malware, monitor user activity and/or conduct denial of service (DoS) attacks, among others. A spyware is a payload designed to track browsing habits and internet activity or users when secretly installed on the computer environment. An adware is a software designed to download unwanted advertising, collect user data, redirect browsers to advertising sites and/or change browser settings, among others.

In a phishing attack, a malware is automatically installed on a computer system when a corresponding user clicks a malicious link. The malware, when installed, can freeze the computer system or steal sensitive user data, such as login credentials and credit card numbers. A MITM attack is designed to secretly relay and possibly modify communications between communicating parties. An SQL injection allows interference with application queries to a corresponding database, therefore, providing access to data accessible by the application. A zero-day exploit attack is a cyber attack that occurs on the same day a weakness (e.g., a vulnerability) is discovered and before a corresponding fix becomes available. In a DNS tunneling attack, the attacker establishes a connection with a victim computer system by infecting the computer system with a malware to cause the computer system to send queries to a DNS resolver. The attacker also makes the DNS resolver to a server of the attacker where a tunneling malware is installed, therefore, creating an indirect connection between a device of the attacker and the victim computer system.

The differences in how these cyber attacks operate and harm the infected computer system call for different responses to such attacks. From the perspective of an owner, a stakeholder or an administrator of a computer environment, the goal is to detect and halt an attack as quick as possible to minimize the damage to the computer environment, and maintain, or quickly restore, normal operation of the computer environment. However, for many of these cyber attacks (e.g., a ransomware, worm or Trojan horse), by the time system administrators or information technology (IT) personnel investigate the nature and type of an ongoing attack, it may be too late to remedy or mitigate any damage in a quick and efficient manner, e.g., without sacrificing business continuity or jeopardizing data privacy. Furthermore, even when the type of attack is identified, the proper response (e.g., among multiple possible responses) to be initiated may still depend on the extent of damage or infection to the computer environment at the time. Unfortunately, most cyber attacks are designed to inflict more damage as time progresses, after initial infection or attack. For instance, a worm will replicate and spread more in the computer environment over time. Also, a ransomware will encrypt more data of the computer environment if given more time.

In the current disclosure, systems and methods for automatic threat response in a computer environment are described. The systems and methods described herein can include a threat response system detecting a threat, such as an ongoing cyber attack or security hole that opens the door for potential attacks. The threat response system can maintain a set of possible responses or resolution and corresponding success or fail criteria. In response to detecting the threat, the threat response system can automatically initiate simulation of a the maintained responses (or resolutions) or a subset thereof. The threat response system can display simulation results for each of the simulated response while simulations are going on. Based on the simulation results, the threat response system can determine or select a proper response, among the simulated responses or resolutions, to be implemented. The threat response system can provide an indication of the determined or selected response or resolution to a user of the threat response system. In some implementations, the threat response system can automatically implement the selected response or resolution within the computer environment.

Figure 2:
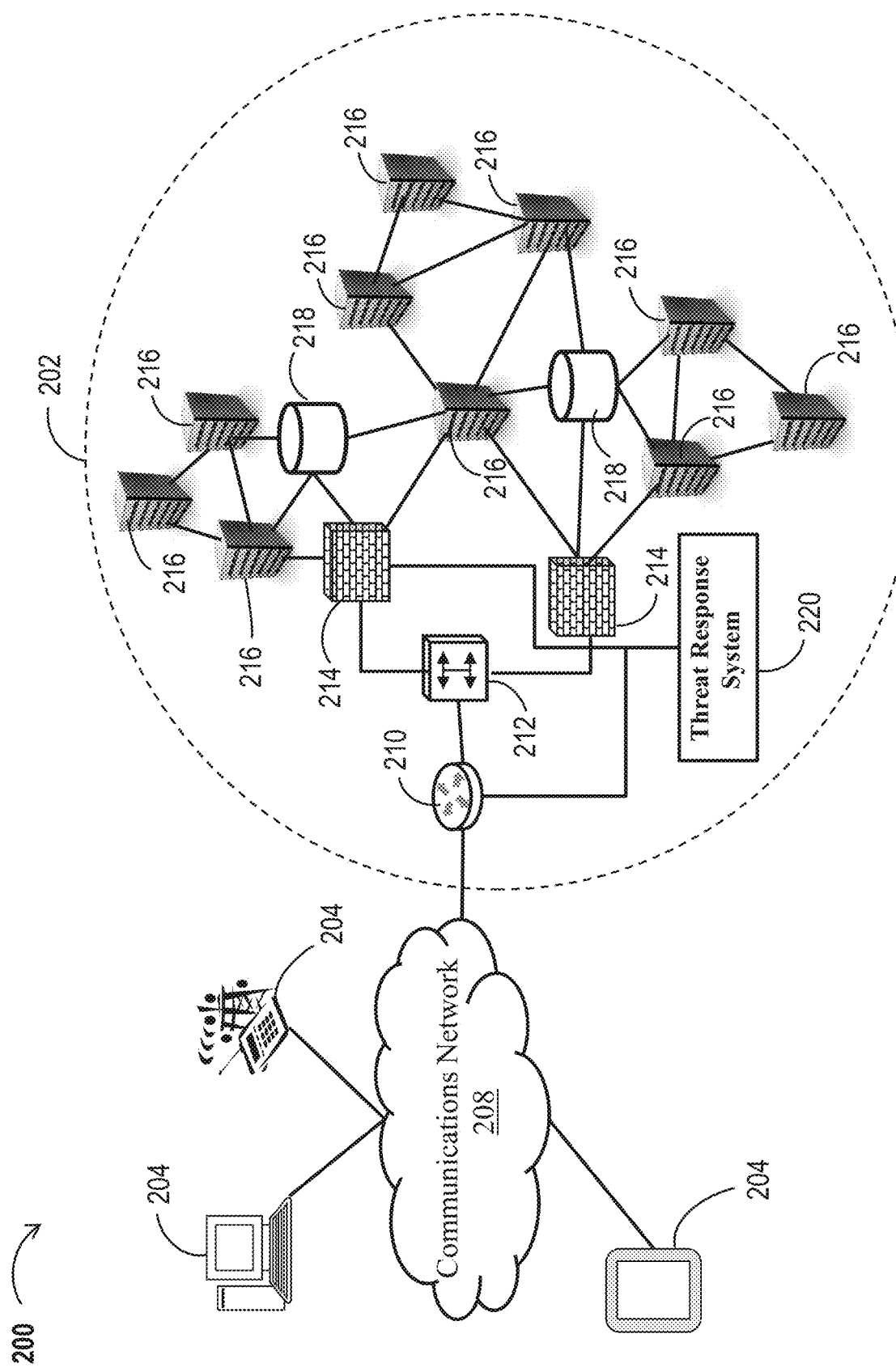
FIG. 2 is a block diagram illustrating an example computer environment employing threat response techniques described herein, according to an example embodiment.

Referring to FIG. 2, a block diagram illustrating an example network environment 200 employing threat response simulation and selection is shown, according to example embodiments. The network environment 200 can include a computer environment 202 and a plurality of communication devices 204. The computer environment 202 and the plurality of communication devices 204 can be communicatively coupled via a communications network 208. The communication network 208 can include a cellular network, a landline network, an optical network, a metropolitan area network (MAN), a wide area network (WAN), the Internet, a private network, a public network or a combination thereof, among others. The communication network 208 can be similar to the network 104 of FIG. 1A. The communication network 208 can be distributed over a plurality of geolocations, metropolitan areas or countries.

The communication devices 204 can include devices of the computer environment 202, such as client devices connecting remotely to the computer environment 202. The communication devices 204 can include client devices, such as the client devices 102 of FIGS. 1A and 1B. For instance, the communication devices 204 can include a smart phone, a tablet device, a mart watch, other handheld device, a laptop, a desktop, a medical device with communication capability, an automated teller machine (ATM), a circuit device, a sensor device, a camera device, a sensor device, a drone, other device with communication capabilities or a combination thereof, among others. The communication devices 204 can be configured to send data to, or access data from, the computer environment 202 via the communication network 208. The computer environment 202 can be arranged in one or more geolocations or sites, and the communication devices 204 can include a device (e.g., a wireless device or an ATM) of the computer environment 202 that is located remotely from the one or more sites. The communication devices 204 can include one or more devices, such as a laptops, desktops, smart phones, handheld devices or computer servers that are not part of the communication environment 202 but are accessing one or more resources of the computer environment 202.

The computer environment 202 can include an enterprise computer network, a cloud network or system, a banking computer system, a power grid system, a medical device network, a social network, a communications network (e.g., wireless communications network), a media streaming system or network, a security monitoring system or a combination thereof, among others. The computer environment 202 can include any combination of communicatively connected electronic devices, electrical devices and/or electromechanical devices. The computer environment 202 can be distributed over, or can include, a plurality of sites associated with distinct geolocations. The computer environment 202 can include one or more solution stacks or solutions. The computer environment 202 can include one or more network devices, such as router 210, network switch 212, a modem device, a wireless router or a combination thereof. The computer environment 202 can include one or more firewall devices (or systems) 214, a plurality of computer servers 216, one or more databases 218, and a threat response system 220. The computer environment 202 can include one or more other computing devices, electronic devices, electromechanical devices, or other devices of other type. The computer environment 202 can include software assets, such as software applications, software programs and/or software platforms. The computer environment 202 can include data assets, such as databases, data folders, data files, data structures or a combination thereof.

The computer servers 216, the databases 218, the network devices and/or the other devices of the computer environment 202 can be communicatively coupled to each other. In general, various devices of the computer environment 202 can be dependent on each other. The interdependencies can include data dependency, software dependency, storage dependency, communication dependency, security dependency or a combination thereof, among other dependencies.

The network devices can manage communication channels within the computer environment 202 as well as communication channels with external devices. The network devices can collect network performance data, such as data indicative of bandwidth usage, packet drop rate, number or rate of out of order packets, transport control protocol (TCP) retransmits, latency or a combination thereof among others. In some implementations, one or more network devices or a network database can maintain the collected network performance data. The collected network performance data can include information related to measured network performance parameters such as time (e.g., timestamps), traffic destination, traffic source, communication link, communication session identifier or a combination thereof, among others.

Each firewall device 214 can maintain a corresponding defined set of security rules. A system administrator of the computer environment 202 or the threat response system 220 can manage the defined set of security rules for each firewall device 214. The firewall device(s) 214 can monitor incoming and/or outgoing network traffic, and decide whether to allow or block specific traffic based on the corresponding set of security rules. The firewall device(s) 214 can also collect data related to security of incoming and/or outgoing network traffic over time. The firewall device(s) 214 or a security database can store the collected security data. The collected security data can include, for example, logs of blocked and/or allowed network traffic, reasons (e.g., invoked security rule) for blocking network traffic, requesting entity and/or source of blocked network traffic or a combination thereof, among others.

The computer servers 216 can include one or more email servers, one or more application servers, one or more client servers, one or more file transfer protocol (FTP) servers, one or more web servers, one or more SQL servers, one or more MICROSOFT EXCHANGE servers, one or more communication servers, one or more authentication servers or a combination thereof, among others. The authentication server(s) can maintain data indicative of successful and/or failed authentications including, for example, a device identifier, a time stamp and/or used login identifier for each authentication or authentication attempt. The application server(s) can maintain data (e.g., session logs) indicative of past and/or current user sessions. For each user session, the application server(s) can store session timing information (e.g., start, end and/or duration), user identification of user initiating the session, device identifier of of communication device 204 initiating or participating in the sessions, data exchanged during the session, activities or tasks performed during the session or a combination thereof. The One or more servers 216 or resources thereof can be accessible by the communication devices 204. Each of the computer servers 216 can be accessible via the firewall(s) 214. In some implementations, one or more computer servers 214 may not be arranged behind the firewall(s) 214.

The database(s) 218 can be maintained by one or more computer servers 216 or one or more storage devices. The database(s) 216 and/or the computer server(s) can be located in a site of the computer environment 202 or a data center hosting some services associated with the computer environment 202. The database(s) 218 can store user authentication data, other user data, application data, web pages, services data, business data, research and development data, marketing data, human resources data or a combination thereof, among others. The data stored by the database(s) 218 can be used by the computer servers 216, or can be accessible by the communication devices 204. The database(s) 218 can store data with different sensitivity or importance. For instance, different access rights can be associated with distinct data sets. The access rights for each data set can be assigned to one or more users or communication devices 204 based on, for example, user profiles, defined firewall security rules, relevance of the data set to various tasks or projects, importance of the data set or a combination thereof.

The threat response system 220 can detect cyber threats, cyber attacks and/or operational threats to assets of the computer environment 202, and in response identify a proper response based on a set of executed simulations. An asset can include a hardware device or system, a software module or system, a data resource (e.g., a database, data file, document, data structure or web page, among others) or a combination thereof, among others. The response threat system 220 can be implemented as software, firmware, hardware or a combination thereof. The threat response system 220 can be communicatively coupled to one or more network devices, such as router 210 and switch 212, firewall devices 214, computer servers 216, databases 218, communication devices 204, other devices associated with the computer environment 202 or a combination thereof. The threat response system 220 is discussed in further detail below with regard to FIGS. 3-5.

Figure 3:
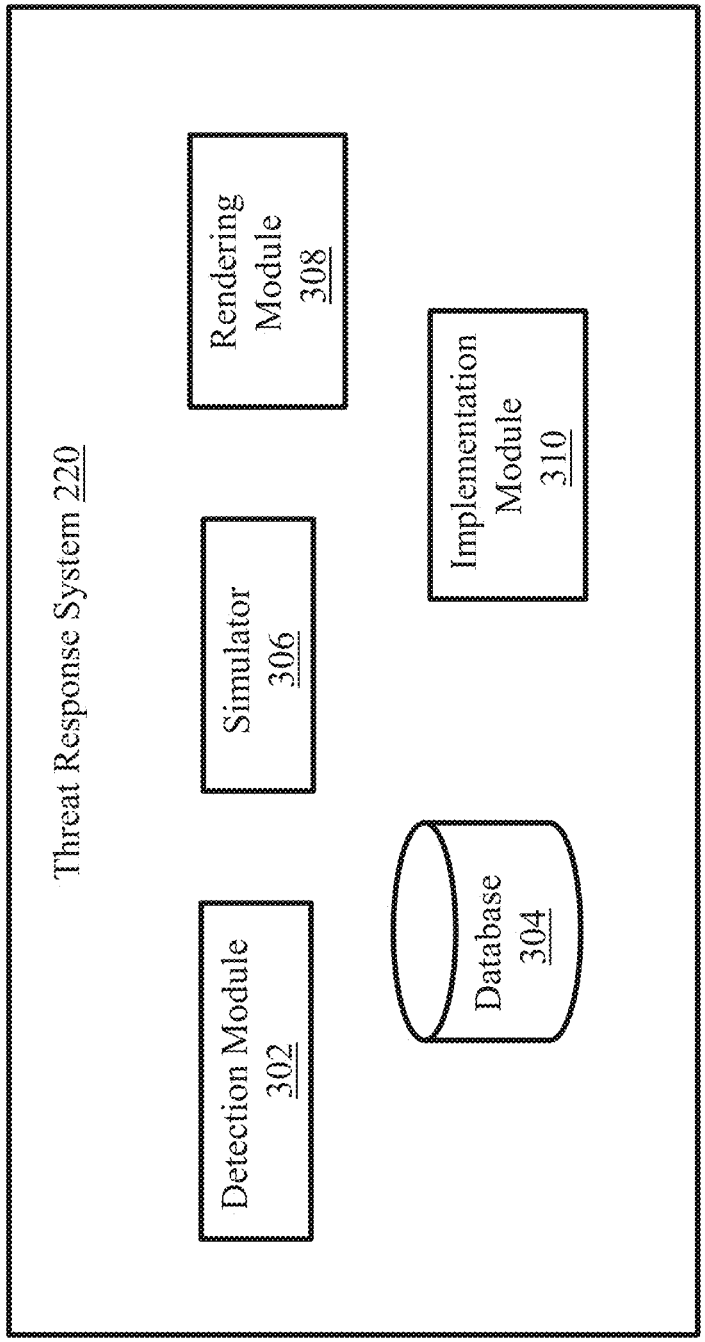
FIG. 3 shows an example block diagram of a threat response system, according to an example embodiment.

Referring to FIG. 3, an example block diagram of the threat response system 220 is shown, according to an example embodiment. In brief overview, the response system 220 can include a detection module 302, a database 304, a simulator 306, a rendering module 308 and an implementation module 310. Each of the modules (or components) of the threat response system 220 can be implemented as a hardware module, a software module, a firmware module, or a combination thereof. For instance, the threat response system 220 can include one or more processors such as processor 121 of FIGS. 1C and 1D and a memory such as the main memory 122 or the cache memory 140. The memory can store computer code instructions, which when executed by the one or more processors can cause the one or more processors to perform methods described herein (e.g., method 400 of FIGS. 4 and 6) or steps thereof associated with the threat response system 220. The functionalities of each of the modules of the threat response system 220 are discussed in further detail below with regard to FIGS. 4 and 5.

Figure 4:
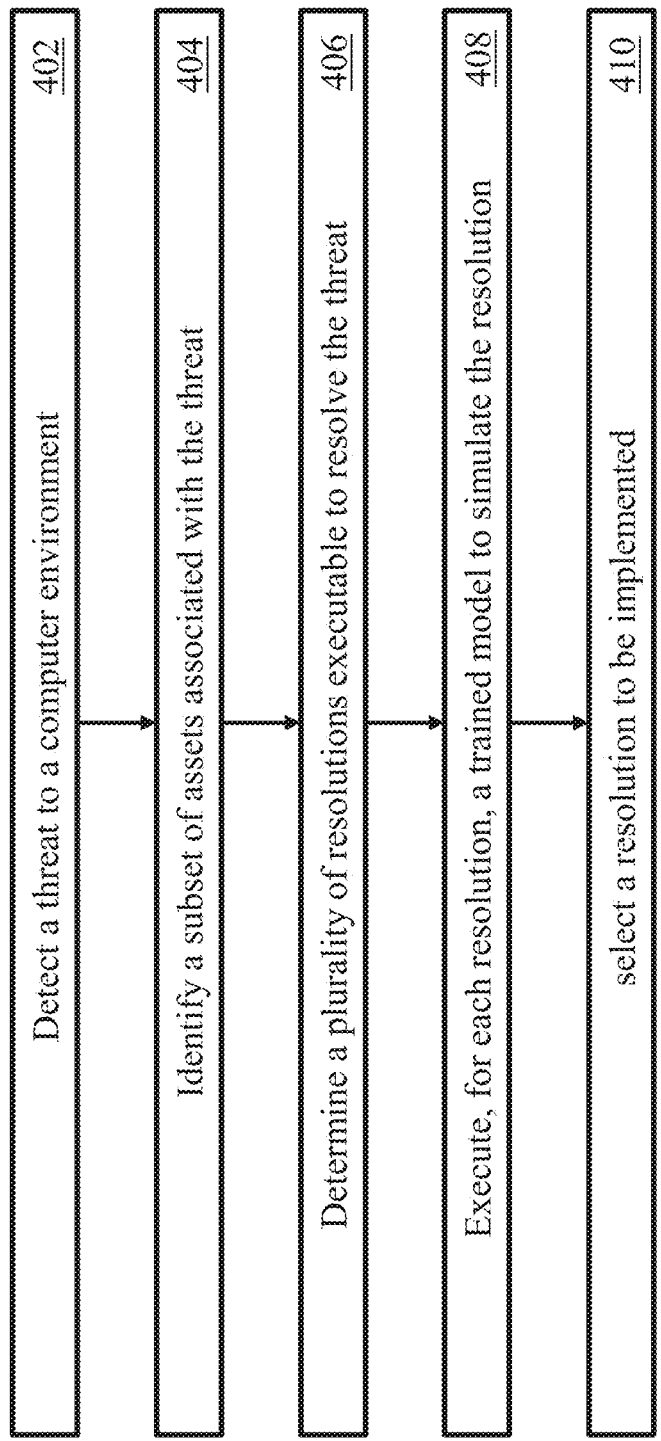
FIG. 4 shows a flowchart illustrating a method for threat response, according to an example embodiment.

FIG. 4 shows a flowchart illustrating a method 400 for threat response in a computer environment, according to an example embodiment. In a brief overview, the method 400 can include the threat response system 220 detecting a threat the computer environment 202 (STEP 402), and identifying a subset of assets of the computer environment 202 associated with the threat (STEP 404). The method 400 can include the threat response system 220 determining a plurality of resolutions executable to resolve the threat (STEP 406), and executing, for each resolution, a trained model to simulate the resolution (STEP 408). The method 400 can include the threat response system 220 selecting a resolution of the plurality of resolutions to be implemented (STEP 410).

Referring to FIGS. 3 and 4, the method 400 can include the detection module 302 detecting the threat to the computer environment 202 (STEP 402). The threat can include an operational threat or a cybersecurity threat (also referred to as a cyber threat). An operational threat can be due to abnormal operations of one or more assets of the computer environment 202, such assets under stress (e.g., continuous or frequent excessive use of computational resources, memory resources and/or communication resources). In some implementations, detecting an operational threat can include the detection module 302 monitoring one or more network assets, such as router 210, switch 212 other network devices or logs thereof, of the computer environment 202 for network performance data. For instance, the detection module 302 can monitor the network assets for bandwidth usage, throughput, latency, packet loss, retransmissions, connectivity and/or availability associated with one or more assets.

In some implementations, detecting an operational threat can include the detection module 302 monitoring computing assets of the computer environment 202 for asset performance data. The detection module 302 can monitor computing devices or assets, such as the servers 216, for usage of computing resources, usage of memory resources, usage of bandwidth, number of applications running thereon and/or application performance data (e.g., application running speed, number of on-going sessions, etc.). The detection module 302 can monitor communication logs, application and/or software logs, error logs or a combination thereof. The detection module 302 can monitor the databases 218 for data stored thereon, accessed data and/or accessing entities, database bandwidth usage, database memory or storage usage, database usage of computing resources or a combination thereof.

Cyber threats can include malicious acts to disrupt asset operations or availability or to damage or steal data. Cyber threats include computer viruses, data breaches, Denial of Service (DoS) attacks and/or other attack vectors. To detect cyber threats, the detection module 302 can monitor or access antivirus scans and/or network scans available within the computer environment 202. The detection module 302 can monitor the firewall devices 214 (or a logs thereof) for information related to denied connections, information related to malicious activities and/or information related to dropped network traffic. The information related to denied connections can include source Internet Protocol (IP) addresses, intended destinations (or IP addresses thereof) and/or denial reasons (e.g., invoked security rules to deny the connections). The information related to dropped network traffic can include indications (e.g., IP addresses) of sources of dropped data packets, indications (e.g., IP addresses) of intended destinations of dropped data packets and/or reasons (e.g., invoked security rules) for dropping data traffic. Malicious activities can include, for example, repetitive denied attempts to access one or more assets of the computer environment 202 by a given source. The information related to malicious activities can include indications of the sources of the activities, indications of the intended destinations, the frequency or number of attempts for each source and/or reasons (e.g., invoked security rules) for blocking or denying the access attempts.

The detecting module 302 can monitor various assets of the computer environment 202 via regular querying of the assets. In some implementations, the assets of the computer environment 202 can be configured to report respective performance data to the threat response system 220 or the detection module 302. For instance, an application or script associated with the threat response system 220 can be installed on the assets of the computer environment 202, and can cause the assets to report corresponding performance data to the computer environment 202. The detection module 302 can compare received performance data to corresponding threshold values to determine whether any of the assets is going through an abnormal operational or cybersecurity state. For instance, the detection module 302 can detect a relatively high bandwidth usage, relatively high memory usage, relatively high CPU usage, relatively slow performance, relatively high packet loss, relatively high retransmission rate or a combination thereof for a given asset based on comparisons of asset performance data with corresponding threshold values. The detection module 302 can detect malware infection of one or more assets based on antivirus scans.

In some implementations, the assets can be configured to monitor respective performance data, and report to the detection module 302 performance failures (e.g., non-availability or loss of connection), error messages related to asset performance, or abnormal asset performance data. The detection module 302 can detect an operational or cybersecurity problem upon detecting a combination of abnormal performance parameters (e.g., a minimum time duration of non-availability or stress, a minimum number (or frequency) of denied access attempts or other suspicious activities and/or minimum communication load, among others). For instance, the detection module 302 can maintain a lookup table or other data structure listing a plurality of potential operational or cybersecurity threats or problems and the conditions for detecting each of the threats or problems. The detection module 302 can use the lookup table in detecting the operational or cybersecurity threat.

The method 400 can include the detection module 302 identifying a subset of assets of the computer environment 202 associated with the detected threat (STEP 404). The detection module 302 can identify one or more first assets affected by the threat, and one or more second assets having an interdependency relationship with the one or more first assets. The subset of assets associated with the threat can include the one or more first assets and the one or more second assets. The interdependency relationship can include data dependency, software dependency, storage dependency, communication dependency, security dependency, physical or logical communication links or a combination thereof, among other dependencies. The subset of assets can include assets that can be directly or indirectly affected by the threat or any remedial action that can be taken to nullify or mitigate the threat.

The detection module 302 can identify, using performance data acquired from various assets of the computer environment 202, the assets that are directly affected by the threat. For example, the detection module 302 can identify all assets associated with abnormal performance parameters, such as unavailability, relatively high bandwidth usage, relatively high CPU usage, relatively high memory usage, relatively high packet loss, relatively high retransmission rate or a combination thereof. The detection module 302 may also identify other assets that belong to the same solution (solution stack) as the directly affected assets, and/or other assets having connection or dependency relationship with the directly affected assets. The detection module 302 may identify other assets that are of similar type or have similar description or functionality as the directly affected assets. In some implementations, the detection module 302 can maintain indications of a plurality of predefined subsets of assets (e.g., solution stacks or other subsystems) of the computer environment 202, and can determine one or more subsets (e.g., including directly affected assets) of the predefined subsets.

The method 400 can include the simulator 306 determining from a predefined set of resolutions a plurality of resolutions or responses executable to resolve the threat (STEP 406), and executing, for each resolution, a trained model to simulate the resolution (STEP 408). The database 304 can maintain one or more data structures, e.g., lookup tables, trees, linked lists, etc., storing a list of possible resolutions to various potential threat or problems. The possible resolutions can include, for example, quarantining, disconnecting or shutting down one or more assets (e.g., the directly affected assets) of the subset of assets, modifying or adding one or more security rules of firewall 214 to block suspicious data traffic or connections, re-routing data traffic, executing an antivirus scan, deleting detected malware, adding or increasing computing resources to the computer environment 202 or the subset of assets, adding storage resources to the computer environment 202 or the subset of assets, and/or adding or increasing communication bandwidth or communication resources to the computer environment 202 or the subset of assets, among others.

The one or more data structures can include, for each resolution, corresponding success or failure criteria, for example, as conditions or output results indicative of success or failure of the simulation of the resolution. For example, the failure criteria can include unavailability of one or more assets of the subset of assets or services thereof during simulation. The failure criteria can include causing one or more assets of the subset of assets to go under stress, e.g., with respect to excessive use of computational, memory or communication resources. Stress can be defined in terms of a threshold of resource usage (e.g., as a percentage of CPU capacity, memory capacity of total bandwidth) and a minimum duration of the excessive use of the resources. Other failure criteria can include, for example, failure to stop suspicious or malicious activities.

In some implementations, the predefined set of resolutions can include a plurality of predefined subsets of resolutions, such that each predefined subset of resolutions can be associated with a corresponding threat type among a plurality of threat types. In other words, each threat type can be mapped to corresponding subset of predefined resolutions to be simulated if the detected threat is of that type. For instance, the predefined resolutions for a detected malicious activities can be different from predefined resolutions for detected asset stress.

The threat response system 220 or the database 304 can maintain a plurality of trained machine learning models. Using historical data of various assets or subsystems of the computer environment, the threat response system 220 (or other computer system) can train one or more models corresponding to the computer environment 202, solutions or solution stacks of the computer environment 202, subsystems of the computer environment 202, assets of the computer environment 202 or a combination thereof. The historical data used to train the models can include CPU usage data, memory usage data, bandwidth usage data, availability data, packet loss data, retransmission rate data, malware replication and spread patterns, malware-based data encryption rate or patterns, or a combination thereof. The trained models can be designed to capture or reflect the behavior of various assets or subsystems of the computer environment 202 under different conditions. The trained models can include statistical models, neural networks or other artificial intelligence (AI) models. The database 304 can store or maintain implementations of the trained models, which can be accessible by the simulator 306.

Figure 5:
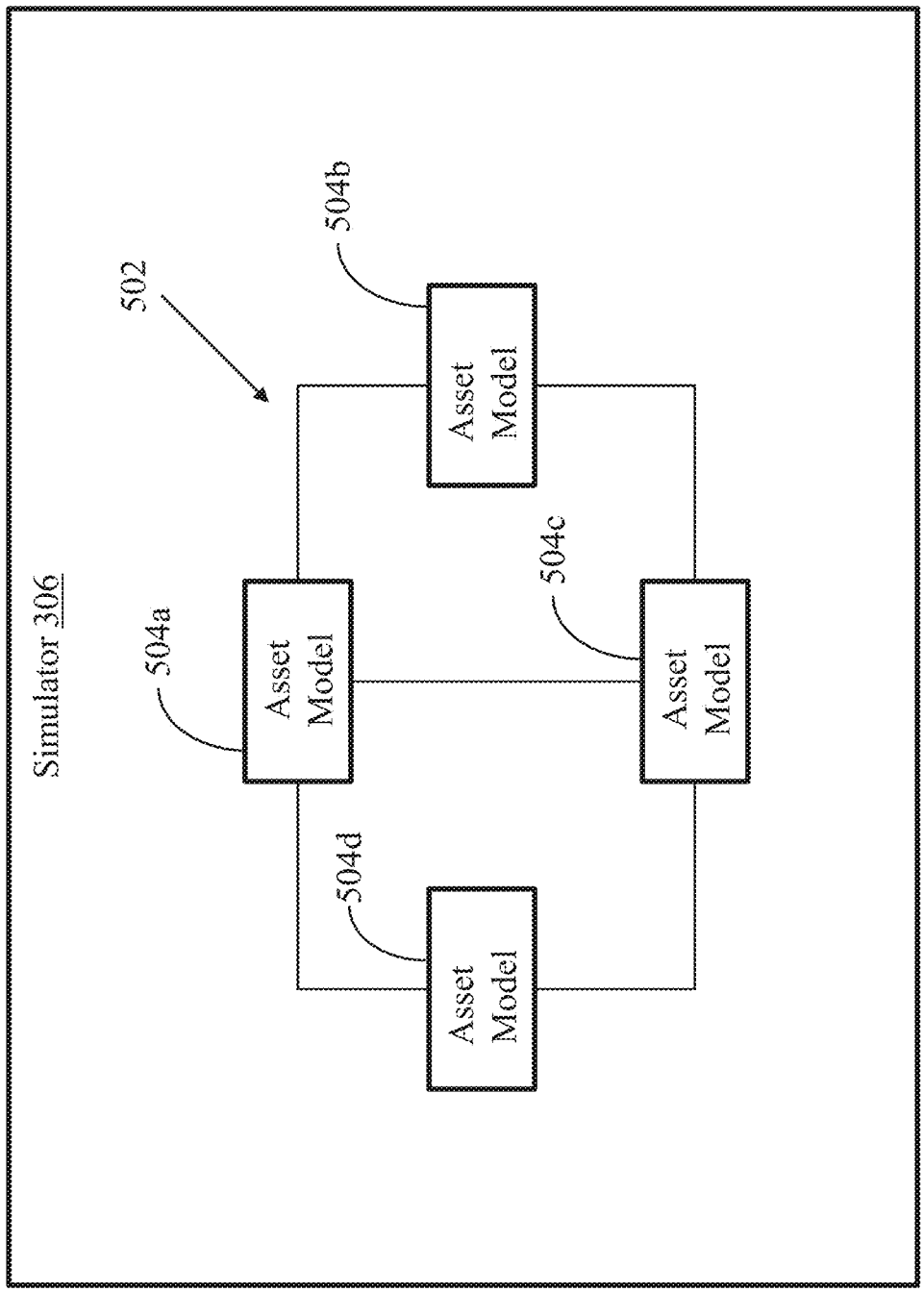
FIG. 5 shows an example block diagram of a simulator, according to an example embodiment.

Referring to FIG. 5, a block diagram illustrating an example implementation of the simulator 306 is shown, according to an example embodiment. The simulator 306 can retrieve a trained model 502 of a subsystem (e.g., solution stack) of the computer environment 202 from the database 304, and execute the trained model 502. The trained model 502 can include a plurality of asset models, such as asset models 504a-504d referred to herein individually or collectively as asset model(s) 504. Each asset model 504 can represent a trained model of a corresponding asset of the identified subset of assets. In the trained model 502, the asset models 504 can be connected, or in some relationship, together in a way that reflects the actual architecture of the subset of assets (e.g., representing a computer subsystem or solution stack) represented by the trained model 502.

The simulator 306 can select or determine a set of resolutions among the possible resolutions maintained by the data structure. The simulator 306 can select or determine the set of resolutions based on a type or characteristics of the operational or cybersecurity threat detected at STEP 402. The simulator 306 can execute various versions of the trained model 502 corresponding to the set of resolutions determined at STEP 406. For instance, in one version of the trained model 502, an asset can be quarantined, disconnected or shutdown, while another can be executed with additional or modified security rules applied to the firewall 214. Another example version of the trained model 502 can include one or more added assets to introduce redundancy.

In some implementations, the simulator 306 can maintain a plurality of trained models each of which is associated with a corresponding predefined resolution. In other words, each predefined resolution can be simulated using a corresponding trained model. In some implementations, the simulator can use other simulating techniques or tolls (e.g., other than trained models) to simulate the predefined resolutions.

The simulator 306 can feed live input data (or input data consisting with or similar to live data) to the various versions of the trained model 502 being simulated. The simulator 306 can execute each trained model with similar data traffic and/or similar processing load as the real-time data traffic and/or real time processing load experienced by the subset of assets. For instance, the traffic data, amount of queries to be processed, initiated or terminated sessions and/or initiated or terminated applications for the simulated versions of the trained model 502 can be similar to those associated with the actual computer subsystem represented by the trained model 502. Also, the asset models 504 can have similar configurations or settings as the corresponding assets of the computer environment. As such, the simulated versions of the trained model 502 follow as closely as possible the actual time-varying reality of the corresponding computer subsystem.

While simulation of the various versions of the trained model 502 is ongoing, the rendering module 308 can display a simulation window for each of the simulations or each of the executing trained models. Each display window can depict real-time simulation progress of the resolution corresponding to the executing trained model. The real time progress can include output or parameters (e.g., availability, CPU usage, memory usage, bandwidth usage, number of malware replicas, amount of encrypted data by malware or amount of data revealed to or stolen by attacker, among others) of the corresponding simulated version of the trained model 502. In some implementations, the rendering module 308 can cause a display window to disappear when the corresponding simulated resolution fails. In other words, the rendering module 308 can keep displaying each simulation window as long as the corresponding simulated resolution did not reach a corresponding fail state. At the end, only display/simulation windows for successfully simulated resolutions will persist on a screen device of the threat response system 220.

The rendering of the simulation windows for the various simulated resolutions allows a user of the threat response system 220 to follow in real time the simulation progress for each of the simulated resolutions. The rendering module 308 can present the cause or type of failure for each failing simulation. The rendering module 308 can present the simulation windows as part of a user interface (UI). The UI can include interactive icons to allow a user to request additional information about the failing or successful simulations. The rendering module 308 can present the additional information, responsive to user request.

The method 400 can include the implementation module 310 selecting a first resolution of the set of resolution to implementing in the computer environment 202 or within the subset of assets (STEP 410). The implementation module 310 can provide details for implementing a successfully simulated resolution as output or for display on a display device. The implementation can be carried out by an administrator or an IT personnel of the computer environment 202. In some implementations, the implementation module 310 can request confirmation from a user of the threat response system 220 to implement a successfully simulated resolution. Upon receipt of user confirmation, the implementation module 310 can automatically implement or execute the successful resolution in the computer environment 202 or within the subset of assets.

The methods, e.g., method 400, described in this disclosure can be carried out by computer code instructions stored on a computer-readable medium. The computer code instructions, when executed by one or more processors of one or more computing device, can cause the computing device to perform the method(s) described herein.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:
one or more processors communicatively coupled to a computer environment including a plurality of assets; and
a memory storing computer code instructions, the computer code instructions, when executed by the one or more processors, cause the one or more processors to:
detect a type of threat to the computer environment;
identify a subset of assets of the plurality of assets associated with the threat;
determine, based at least on the type of threat, from a predefined set of resolutions a plurality of resolutions executable to resolve the threat for the subset of assets;
execute, for each resolution of the plurality of resolutions, a trained model to simulate the resolution for the subset of assets, each resolution have a corresponding success or failure criteria, each trained model having a plurality of assets models corresponding to and to simulate the subset of assets; and
select, based at least on results of execution of each resolution and each resolution's corresponding success or failure criteria, a resolution among the plurality of resolutions to be implemented to resolve the threat for the subset of assets; and wherein in executing trained models to simulate the plurality of resolutions for the subset of assets, the one or more processors are configured to execute each trained model with similar traffic or processing load as a real-time traffic or processing load of the subset of assets.

2. The system of claim 1, wherein the one or more processors are further configured to implement the selected resolution within the computer environment.

3. The system of claim 1, wherein the one or more processors are further configured to provide information related to implementation of the selected resolution within the computer environment for display on a display device.

4. The system of claim 1, wherein in detecting a threat, the one or more processors are configured to monitor logs of a firewall of the computer environment for at least one of:
information related to denied connections;
information related to malicious activities; or
information related to dropped network traffic.

5. The system of claim 1, wherein in detecting a threat, the one or more processors are configured to perform at least one of:
monitor one or more network assets of the computer environment for network performance data; or
monitor computing assets of the computer environment for asset performance data.

6. The system of claim 1, wherein in identifying the subset of assets, the one or more processors are configured to:
identify one or more first assets affected by the threat; and
identify one or more second assets having an interdependency relationship with the one or more first assets, the subset of assets including the one or more first assets and the one or more second assets.

7. The system of claim 1, wherein the plurality of resolutions can include at least one of:
quarantining one or more assets of the subset of assets;
re-routing data traffic;
adding storage resources to the computer environment;
adding computing resources to the computer environment;
adding one or more security rules to a firewall of the computer environment; or
modifying a configuration of one or more assets of the computer environment.

8. The system of claim 1, wherein the predefined set of resolutions includes a plurality of predefined subsets of resolutions, each predefined subset of resolutions associated with a corresponding threat type among a plurality of threat types.

9. The system of claim 1, wherein the one or more processors are further configured to display a simulation window for each executing trained model, the simulation window depicting simulation progress of the resolution corresponding to the executing trained model.

10. A method comprising:
detecting, by one or more processors, a type of threat to the computer environment;
identifying, by the one or more processors, a subset of assets of the plurality of assets associated with the threat;
determining, by the one or more processors based at least on the type of threat, from a predefined set of resolutions a plurality of resolutions executable to resolve the threat for the subset of assets;
executing, by the one or more processors, for each resolution of the plurality of resolutions, a trained model to simulate the resolution for the subset of assets, each resolution have a corresponding success or failure criteria, each trained model having a plurality of assets models corresponding to and to simulate the subset of assets; and
selecting, by the one or more processors, based at least on results of execution of each resolution and each resolution's corresponding success or failure criteria, a resolution among the plurality of resolutions to be implemented to resolve the threat for the subset of assets; and
wherein executing trained models to simulate the plurality of resolutions for the subset of assets includes executing each trained model with similar traffic or processing load as a real-time traffic or processing load of the subset of assets.

11. The method of claim 10, further comprising at least one of:
implementing the selected resolution within the computer environment; or
providing information related to implementation of the selected resolution within the computer environment for display on a display device.

12. The method of claim 10, wherein detecting a threat includes monitoring logs of a firewall of the computer environment for at least one of:
  information related to denied connections;
  information related to malicious activities; or
  information related to dropped network traffic.

13. The method of claim 10, wherein detecting a threat includes at least one of:
  monitoring one or more network assets of the computer environment for network performance data; or
  monitoring computing assets of the computer environment for asset performance data.

14. The method of claim 10, wherein identifying the subset of assets includes:
  identifying one or more first assets affected by the threat; and
  identifying one or more second assets having an interdependency relationship with the one or more first assets, the subset of assets including the one or more first assets and the one or more second assets.

15. The system of claim 1, wherein the plurality of resolutions can include at least one of:
  quarantining one or more assets of the subset of assets;
  re-routing data traffic;
  adding storage resources to the computer environment;
  adding computing resources to the computer environment;
  adding one or more security rules to a firewall of the computer environment; or
  modifying a configuration of one or more assets of the computer environment.

16. The method of claim 10, wherein the predefined set of resolutions includes a plurality of predefined subsets of resolutions, each predefined subset of resolutions associated with a corresponding threat type among a plurality of threat types.

17. The method of claim 10, wherein the one or more processors are further configured to display a simulation window for each executing trained model, the simulation window depicting simulation progress of the resolution corresponding to the executing trained model.

18. A non-transitory computer-readable medium storing computer executable instructions, the computer executable instructions when executed by one or more processors cause the one or more processors to:
  detect a type of threat to the computer environment;
  identify a subset of assets of the plurality of assets associated with the threat;
  determine, based at least on the type of threat, from a predefined set of resolutions a plurality of resolutions executable to resolve the threat for the subset of assets;
  execute, for each resolution of the plurality of resolutions, a trained model to simulate the resolution for the subset of assets, each resolution have a corresponding success or failure criteria, each trained model having a plurality of assets models corresponding to and to simulate the subset of assets; and
  select, based at least on results of execution of each resolution and each resolution's corresponding success or failure criteria, a resolution among the plurality of resolutions to be implemented to resolve the threat for the subset of assets; and wherein in executing trained models to simulate the plurality of resolutions for the subset of assets, the one or more processors are configured to execute each trained model with similar traffic or processing load as a real-time traffic or processing load of the subset of assets.

* * * * *